United States Patent
Bauer (10) Patent No.: US 8,186,450 B2
(45) Date of Patent: May 29, 2012

(54) ZONE TILLAGE TOOL AND METHOD

(75) Inventor: Mark A. Bauer, Faribault, MN (US)

(73) Assignee: Enviromental Tillage Systems, Inc., Fairbault, MN (US)

(*) Notice: Subject to any disclaimer, the term of this patent is extended or adjusted under 35 U.S.C. 154(b) by 0 days.

(21) Appl. No.: 12/512,671

(22) Filed: Jul. 30, 2009

(65) Prior Publication Data

US 2010/0006310 A1  Jan. 14, 2010

Related U.S. Application Data

(62) Division of application No. 11/189,263, filed on Jul. 26, 2005, now Pat. No. 7,575,066.

(60) Provisional application No. 60/614,009, filed on Sep. 28, 2004.

(51) Int. Cl.
  *A01B 21/02* (2006.01)
(52) U.S. Cl. .................. 172/540; 172/166; 172/551
(58) Field of Classification Search .............. 172/540, 172/542, 551, 554, 555, 556, 518, 604, 599, 172/601, 165, 166; 111/118
  See application file for complete search history.

(56) References Cited

U.S. PATENT DOCUMENTS

| | | | | |
|---|---|---|---|---|
| 2,528,897 A * | 11/1950 | Mayfield | .................. | 172/555 |
| 2,590,790 A * | 3/1952 | Pettman | .................. | 172/556 |
| 3,292,281 A * | 12/1966 | Petersen | .................. | 37/454 |
| 3,435,904 A * | 4/1969 | Rice | .................. | 172/556 |
| 3,504,748 A * | 4/1970 | Croft | .................. | 172/42 |
| 3,737,199 A * | 6/1973 | Stephenson | .................. | 299/101 |
| 3,941,193 A * | 3/1976 | Shoemaker | .................. | 172/106 |
| 4,213,408 A * | 7/1980 | West et al. | .................. | 111/194 |
| 4,412,587 A * | 11/1983 | van der Lely | .................. | 172/39 |
| 4,469,185 A * | 9/1984 | Fox et al. | .................. | 172/540 |
| 4,913,070 A * | 4/1990 | Morrison, Jr. | .................. | 111/135 |
| 5,333,694 A * | 8/1994 | Roggenbuck et al. | .................. | 172/156 |
| 5,346,020 A * | 9/1994 | Bassett | .................. | 172/540 |
| 5,620,055 A * | 4/1997 | Javerlhac | .................. | 172/604 |
| 7,575,066 B2 * | 8/2009 | Bauer | .................. | 172/540 |

* cited by examiner

*Primary Examiner* — Robert Pezzuto
*Assistant Examiner* — Jamie L McGowan
(74) *Attorney, Agent, or Firm* — James W. Miller (57) ABSTRACT

A zone tillage tool comprises a tool frame connected by a parallel lift linkage to a tool bar. A fall tillage coulter or dual spring tillage coulters can be carried on the tool frame in advance of a pair of containment coulters. The fall tillage coulter tills soil in a zone that is approximately 7 to 9 inches deep while the spring tillage coulters till 2 to 3 inches deep. The fall tillage coulter includes a plurality of shovel bits located around the circumference thereof at a forward rake angle. The tip of each shovel bit has a generally vertical entry position into the ground due to the forward rake angle. As the fall tillage coulter rotates, the shovel bits rotate around and exit the soil in a generally horizontal position, thereby lifting and loosening the soil without compacting the soil through a series of rearwardly and upwardly directed soil scooping actions.

20 Claims, 8 Drawing Sheets

ZONE TILLAGE TOOL AND METHOD

CROSS REFERENCE TO RELATED APPLICATIONS

This application is a division of application Ser. No. 11/189,263, filed Jul. 26, 2005, now U.S. Pat. No. 7,575,066, that claims the benefit of one or more previously filed copending provisional applications identified as follows: Application Ser. No. 60/614,009 filed Sep. 28, 2004.

TECHNICAL FIELD

This invention relates generally to a farming practice known as zone tillage. More particularly, this invention relates to a new method of zone tillage as well as to a new tillage tool developed for and used in this new method.

BACKGROUND OF THE INVENTION

During the twentieth century, most farmers began to heavily cultivate their land to increase crop yields. After the fall harvest, a farmer often plowed under the entire field from fence post to fence post. Fertilizer would often be applied over the entire field at the same time. Again, before the spring planting, the farmer would retill the field and apply more fertilizer to further prepare the soil for planting.

While this full field tillage method of farming does produce large crops, it does so at a substantial economic and environmental cost. It is expensive to fertilize large fields due to the need to purchase and spray large quantities of fertilizer. Moreover, fertilizer will wash or run off a farm field and enter nearby waterways such as creeks, rivers, lakes and the like. Such fertilizer then becomes a pollutant, degrading water quality and promoting the growth of unhealthy vegetation, such as algae, in the waterway.

In addition, plowing an entire field under exposes the soil to the elements. Wind and water act on the exposed soil and can blow or wash away large quantities of valuable and irreplaceable soil. The crop residue left after a harvest, namely the unremoved crop stubble and crop remnants, normally anchor the soil against the erosion caused by wind and water. However, in the full field tillage method of farming under consideration, this crop residue has been plowed under and is no longer effective to prevent erosion. Erosion of agricultural fields is a serious problem which could limit future food production by making the land less productive.

Alternative methods of farming have been proposed to try and solve some of the problems noted above. For example, in no till farming, the field is not plowed under after harvest, but is left in an untilled state with crop residue covering the field. This crop residue is effective in limiting soil erosion. However, crop yields are generally not as high with no till farming as with full field tillage. In addition, some farmers may have aesthetic objections to a no till field when compared to a plowed field. Thus, no till farming has had limited use by farmers despite its environmental advantages.

Strip tillage or zone tillage are synonymous terms and refer to a method of farming for crops that grow in rows, such as corn or soybeans. In zone tillage, the farmer does not till and fertilize the entire field, but only the elongated strips or zones of ground that will be planted with the upcoming season's row crop. Moreover, the farmer uses a less aggressive tilling method and does not completely plow or turn the soil under.

Row crops have variable row spacing depending upon the crop being planted, the characteristics of an individual farmer's land and the farmer's own preferences. The spacing may range from 15" to 40" or more. For example, corn is often planted in rows that are 30" apart. Zone tillage tills a zone for each crop row that is only a few inches to a foot or so wide leaving the remaining ground between adjacent rows completely untilled. The crop residue left in the untilled ground acts to prevent or limit soil erosion.

In addition, zone tillage is far more economical in the use of energy and fertilizer than when the entire field is plowed under and fertilized. Only approximately one third of the field is tilled and fertilized in zone tillage. Fuel consumption and wear and tear on a farmer's equipment are reduced. In addition, the cost for fertilizer is significantly lowered since only one third to one half of the previous amounts of fertilizer are now used. Nonetheless, weed growth is significantly retarded since weed seeds in the untilled ground between adjacent zones remain undisturbed and since no fertilizer is applied to such untilled ground, thereby preventing or slowing the germination of the weed seeds and the growth of weeds.

Farming experts consider zone tillage to have the same environmental benefits as no till farming. Yet, unlike no till farming, crop yields do not appear to significantly suffer compared to the yields from more conventional farming methods. In fact, some studies indicate that crop yields from zone tillage may actually surpass the crop yields from full field tillage and fertilization.

Conventionally, zone tillage in the fall involves the use of a tillage coulter to cut a slit in the ground followed by a trailing fixed rear knife or shank having a forwardly facing cutting tooth. This fall tool (i.e. a single coulter with trailing fixed rear knife) has to reach a depth of 6 to 10 inches or so. A pair of containment coulters roll along behind the knife to help confine the soil to the zone that has been tilled, namely to prevent the soil from spreading laterally outside the zone.

In the spring, zone tillage involves just the use of one or more tillage coulters rolling through the zone without the trailing fixed rear knife and without the containment coulters used in the fall. Spring tillage is done at far shallower depths than in the fall, i.e. at depths of 2 to 3 inches.

Known zone tillage tools and methods have certain problems that limit wider adoption of zone tillage by farmers. As one pushes a knife forwardly through the ground, it is common for some of the crop residue in the zone being tilled to catch or snag around the knife and trail rearwardly from the knife. This is a condition known as plugging. When too much residue or debris plug the knife, the farmer must stop and clear the residue or debris by hand. This is obviously inconvenient and time consuming.

Moreover, zone tillage has to date been best suited for use on relatively flat ground. When zone tillage has been tried on sloping ground, there has been a tendency for washouts to occur. This is where rainwater runs down the tilled zones in a field and washes some of the loosened soil out of the zones by carrying the soil along the zones down the slope of the hill.

Thus, there is a need in the farming art for a new method of zone tillage as well as a new tool for solving some of these problems. This invention provides such a new method and new tool of zone tillage.

SUMMARY OF THE INVENTION

One aspect of this invention relates to a zone tillage tool for tilling soil in an elongated zone in a farm field. The tool comprises a tool frame. A tillage coulter is carried on the tool frame for rotation about an axis. The tillage coulter has a circumference. A plurality of shovel bits are carried around the circumference of the tillage coulter. Each shovel bit has at least a portion which forms a laterally projecting wing on at least one face of the tillage coulter which wing lifts and loosens the soil in the zone as the tillage coulter rolls along the zone and the shovel bit is inserted into and rotated through the soil in the zone by rotation of the tillage coulter.

Yet another aspect of this invention relates to a zone tillage tool for tilling soil in an elongated zone in a farm field. The tool comprises a tool frame. At least one tillage coulter is rotatably carried on the tool frame. A pair of containment coulters are rotatably carried on the tool frame at least partially behind the tillage coulter taken with respect to a forward direction of motion of the tool frame.

One additional aspect of this invention relates to a zone tillage tool for tilling soil in an elongated zone in a farm field. The zone tillage tool comprises a tool frame. At least one tillage coulter is rotatably carried on the tool frame. The tillage coulter is notched around a circumference thereof to define a plurality of teeth having leading and trailing edges taken with reference to a direction of rotation of the coulter as the tool frame is moved forwardly over the zone. The leading edge of each tooth on the tillage coulter is forwardly raked relative to a radial line from an axis of rotation of the tillage coulter.

BRIEF DESCRIPTION OF THE DRAWINGS

This invention will be described more completely in the following Detailed Description, when taken in conjunction with the following drawings, in which like reference numerals refer to like elements throughout.

FIG. 3 is a perspective view similar to FIG. 1, but particularly illustrating the zone tillage tool of this invention with a pair of spring tillage coulters in place for relatively shallow spring tillage;

DETAILED DESCRIPTION

Figure 1:
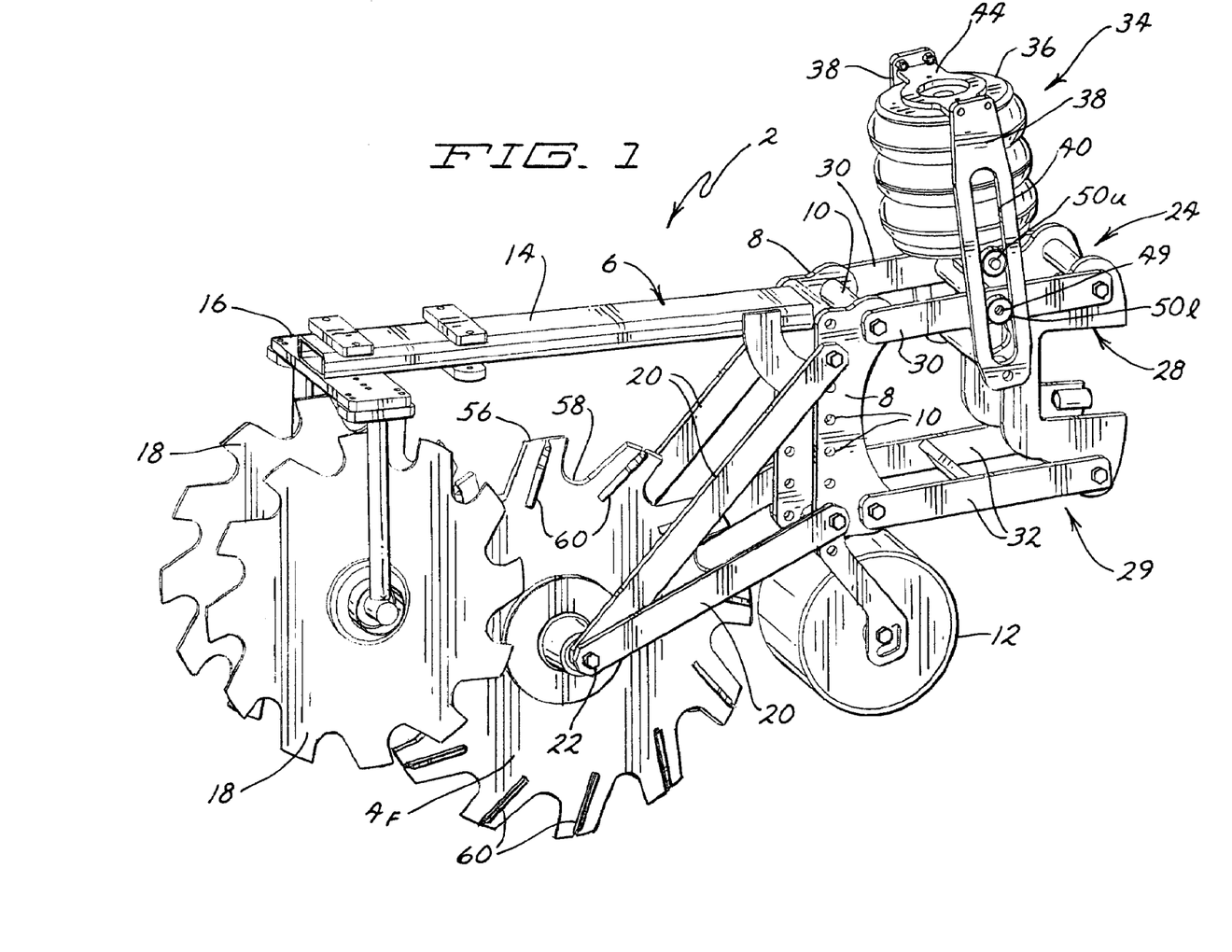
FIG. 1 is a perspective view of a zone tillage tool according to this invention, particularly illustrating the tool with the fall tillage coulter in place for relatively deep fall tillage.

One embodiment of a zone tillage tool according to this invention is illustrated generally as 2 in FIG. 1. Tool 2 is shown equipped with a novel fall tillage coulter $4_f$ for tillage in the fall after the usual harvest of a summer crop. FIG. 3 shows the same tool 2 equipped with a pair of spring tillage coulters $4_s$ for tillage in the spring prior to planting. A new method of zone tillage will be described below in conjunction with the fall and spring tillage coulters $4_f$ and $4_s$ shown in FIGS. 1 and 3.

The Fall Tillage Configuration

The Tool Frame

Tool 2 has a tool frame 6 comprising a pair of spaced side plates 8 that are fixed together by one or more crosstubes 10. Side plates 8 each have an array of vertical mounting holes 10. A rotatable gauge wheel 12 may be installed in a selected one of different pairs of holes 10 to vary the height of tool frame 6 relative to the ground. When gauge wheel 12 is positioned in the lowest pair of holes 10, fall tillage coulter $4_f$ is positioned at its minimum depth. Moving gauge wheel 12 up to higher pairs of holes 10 in side plates 8 will lower the depth of fall tillage coulter $4_f$.

Figure 4:
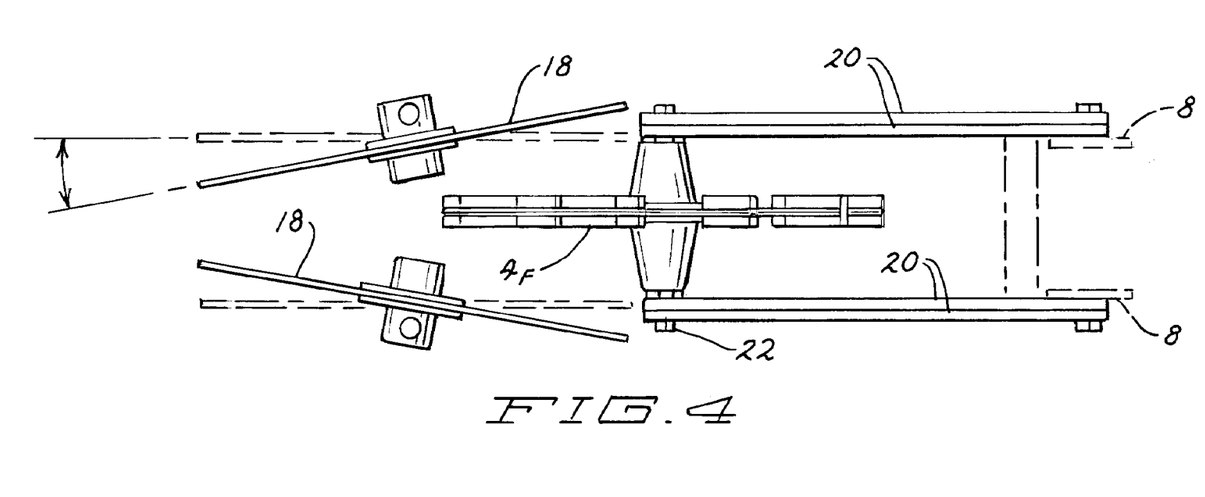
FIG. 4 is a partial top plan view of the zone tillage tool of FIG. 1, particularly illustrating the fall tillage coulter between a pair of trailing containment coulters.
Figure 5:
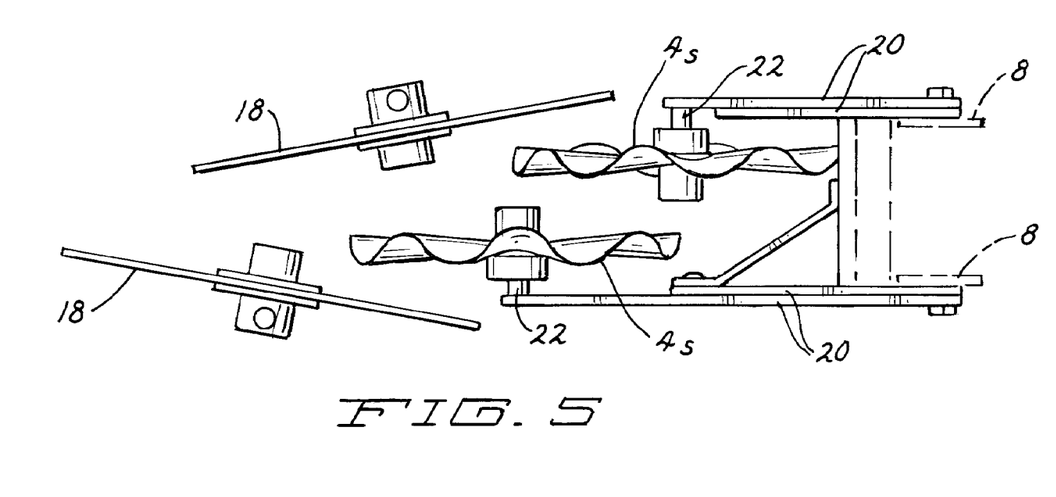
FIG. 5 is a partial top plan view similar to FIG. 4, particularly illustrating the pair of spring tillage coulters shown in FIG. 3 between a pair of trailing containment coulters.

A rearwardly extending, cantilever support beam 14 is fixed to the top and rear of tool frame 6. The free end 16 of support beam 14 is used to rotatably suspend a pair of containment coulters 18 behind fall tillage coulter $4_f$. Containment coulters 18 can adjust fore and aft on support beam 14 and can further be adjusted to toe inwardly as they extend rearwardly as shown in FIGS. 4 and 5. The amount of the toe in is variable as shown by the solid and phantom line illustrations in FIG. 4. In addition, each containment coulter 18 is also preferably canted by approximately 5° or so (not shown in the drawings) relative to a vertical plane passing through containment coulter 18 so that containment coulters 18 also slant laterally outwardly as they extend downwardly.

Figure 2:
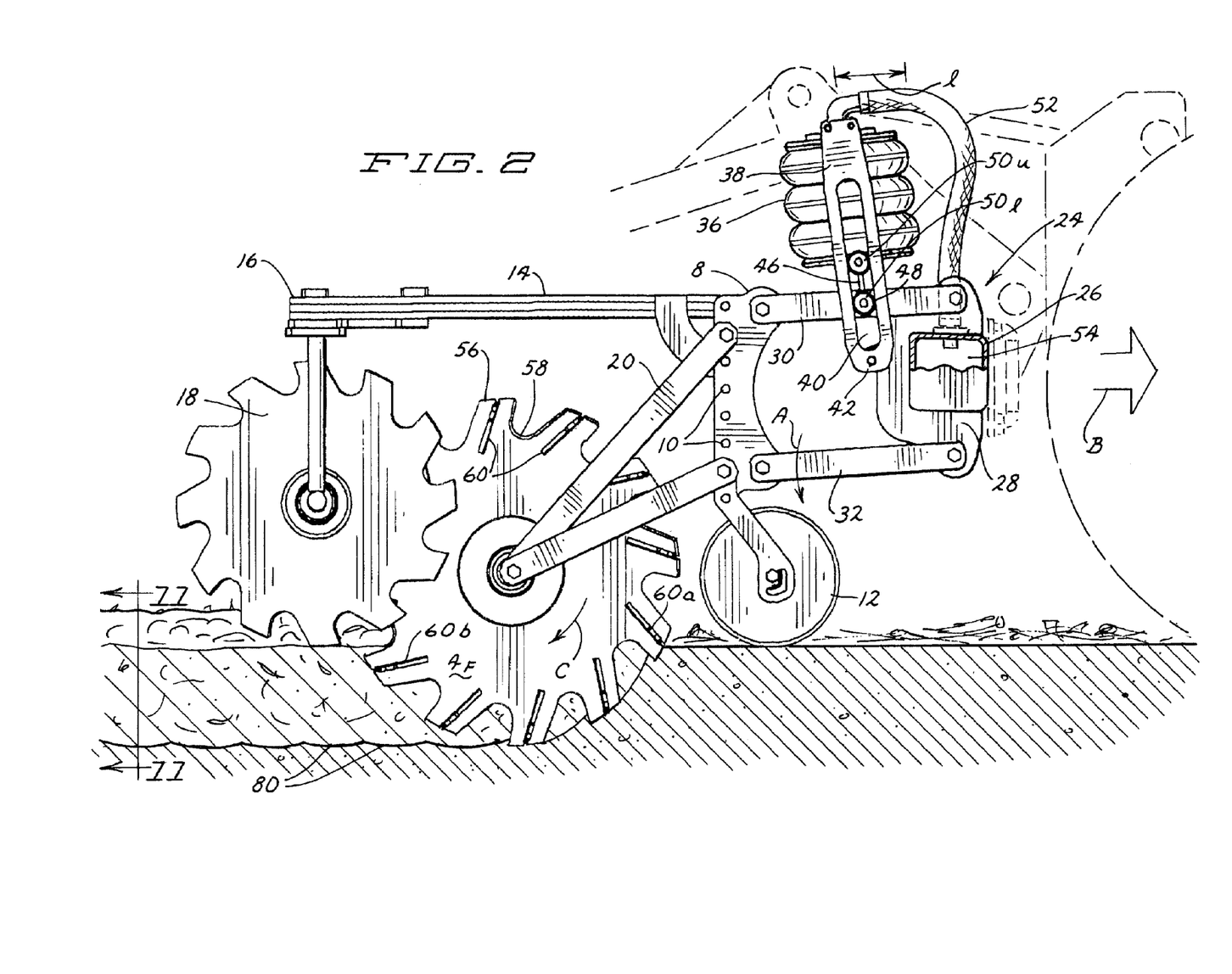
FIG. 2 is a side elevational view of the zone tillage tool of FIG. 1, particularly illustrating the operation of the fall tillage coulter.

A fall tillage coulter $4_f$ is rotatably supported on tool frame 6 by two pairs of support arms 20. As shown in FIGS. 1 and 2, each pair of support arms 20 bolt at one end to some of the holes 10 in each side plate 8. The other ends of the support arms 20 in each pair overlap and abut one another to support one side of a transverse, horizontal axle 22. A single fall tillage coulter $4_f$, to be described in more detail below, rotates on axle 22.

Fall tillage coulter $4_f$ is located between and partially ahead of the pair of containment coulters 18. As shown in FIG. 4, the rear half of fall tillage coulter $4_f$ is located between the front halves of containment coulters 18. As will be described hereafter, containment coulters 18 help confine and mound the soil that has been lifted and loosened by fall tillage coulter $4_f$.

The Tool Mount and Downforce System

Tool 2 includes a mount 24 for attaching tool frame 6 to a transversely extending tool bar 26 on the rear of a tractor. Mount 24 includes a C-shaped clamp 28 that may be bolted to or clamped around tool bar 26. When so secured, clamp 28 is rigid with or fixed to tool bar 26 and acts as a portion of tool bar 26.

In addition, mount 24 includes a parallel lift linkage 29 comprising two pairs of parallel upper and lower pivot links 30 and 32. Links 30 and 32 in each pair are pivotally connected at one end to clamp 28 and at the other end to side plates 8 of tool frame 6. Parallel lift linkage 29 formed by links 30 and 32 allows tool frame 6 to move vertically up and down on tool bar 26 while maintaining a preset orientation with respect to the ground. Support beam 14 will remain substantially parallel to the ground as tool frame 6 rises and falls.

Tool 2 includes a system 34 for applying downforce to tool frame 6 to cause fall tillage coulter $4_f$ to reach a desired depth in the ground. Downforce system 34 comprises a pneumatic bellows or air bag 36 overlying the upper parallel pivot links 30 of parallel lift linkage 29. This allows air bag 36 to have a diameter that is larger than the transverse distance between links 30. This increases the capacity of air bag 36 and thus increases the amount of downforce that air bag 36 can generate.

Air bag 36 acts between tool bar 26 and parallel lift linkage 29 to apply downforce to parallel lift linkage 29 and thus to tool frame 6. A pair of parallel mounting brackets 38 are provided with one bracket 28 extending vertically along and adjacent each side of air bag 36. Each bracket 38 includes a vertical slot 40. The lower end of each bracket 38 is pivotally attached at 42 to clamp 28. The upper ends of brackets 38 are joined together by an upper plate 44. The top of air bag 36 is vertically confined by the underside of upper plate 44.

The bottom of air bag 36 attaches to a saddle shaped stand 46 that is fixed to and extends upwardly from a pivot tube 48. Pivot tube 48 transversely extends between the upper pivot links 30 and is carried by and rotates on a fixed pivot bolt 49 extending between pivot links 30. Pivot tube 48 is located rearwardly of the pivot axis of parallel lift linkage 29 on clamp 28 as indicated by lever arm 1 in FIG. 2. Thus, any force developed by air bag 36 will act on pivot tube 48 to rotate parallel lift linkage 29 downwardly towards the ground in the direction of arrow A in FIG. 2. The actual downforce applied to parallel lift linkage 29 will be the force generated by air bag 36 multiplied by the length of lever arm 1.

An upper bearing $50_u$ and a lower bearing $50_l$ are received in each slot 40 in each bracket 38. An upper bearing $50_u$ is mounted for rotation to each side of the stand 46 that supports the bottom of air bag 36. A lower bearing $50_l$ is mounted for rotation on each end of pivot bolt 49. The engagement of bearings $50_u$ and $50_l$ in slots 40 ensure that top and bottom of air bag 36 remain parallel to each other and that air bag 36 is not twisted or deformed during movement of tool frame 6.

Air bag 36 is coupled by a relatively large diameter hose 52, e.g. a hose 52 having a diameter of 1.5 inches, to an air supply manifold 54 carried on tool bar 26 or on the tractor. Preferably, the interior of tool bar 26 forms manifold 54. A compressor or other source of pressurized air (not shown) on the tractor can pressurize manifold 54 and thus pressurize air bag 36. Increasing pressure in air bag 36 only causes more force to be applied by air bag 36 to stand 46 and thus to parallel lift linkage 29. This is the source of the downforce on tool frame 6.

The invention has thus far been described in terms of a single tool 2. However, it should be understood that tool bar 26 will usually mount a series of identical tools 2 in a side-by-side fashion across the length of tool bar 26. Tools 2 will be spaced apart from one another by a spacing equal to the desired spacing of the crop rows. If a 30" crop row spacing is desired, then tools 2 will be spaced 30" apart. Each tool 2 is independent of the action of the others. Each tool 2 has its own tool frame 6, its own tillage and containment coulters 4 and 18, its own parallel lift linkage 29, and its own air bag 36. However, all air bags 36 are connected by their own individual hoses 52 to a common manifold 54.

Manifold 54 and the large diameter connecting hoses 52 allows individual tools 2 to hit subsurface rocks or the like without overpressurizing downforce system 34. Suppose one or two tillage coulters $4_f$ hit an object such as a rock. Such coulters $4_f$ will be forced upwardly by the object with parallel lift linkages 29 pivoting as needed to allow this upward motion. This will partially or fully collapse the air bag(s) 36 for this particular tool or tools. However, hoses 52 are large enough and manifold 54 has a sufficient capacity to accommodate the air displaced from one or two collapsing air bags 36 with only a minimal pressure rise throughout downforce system 34. Thus, damage is avoided to individual tools 2 and to downforce system 34.

The Fall Tillage Coulter

Before proceeding further, the Applicant intends to provide a special definition for the term "coulter" as used throughout this application, whether referring to fall tillage coulter $4_f$, spring tillage coulters $4_s$, or containment coulters 18. The term "coulter" is defined to mean a rotary tool that rotates about an axis and during such rotation acts in some way on the ground. The term coulter is not intended to apply to a fixed, non-rotatable knife carried on tool bar 26, but only to a rotary tool. The term coulter as used in this application should be read and construed with this definition in mind.

Figure 6:
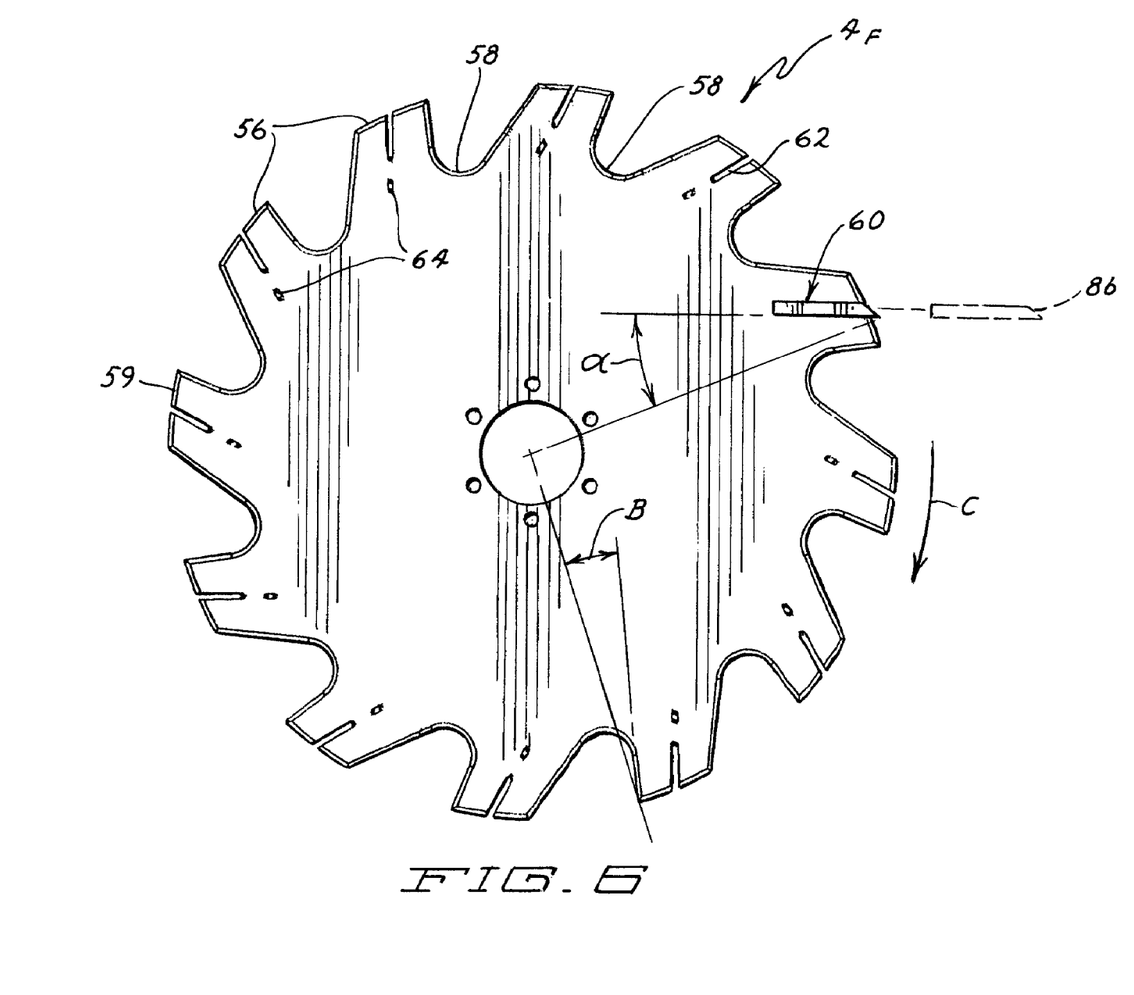
FIG. 6 is a side elevational view of the fall tillage coulter shown in FIGS. 1, 2 and 4, particularly illustrating one of the shovel bits carried by the fall tillage coulter.
Figure 7:
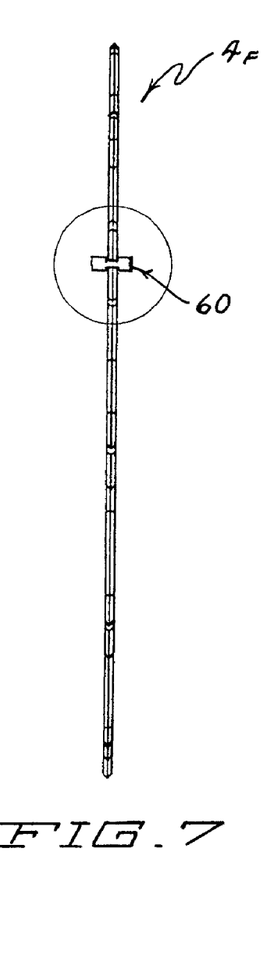
FIG. 7 is a front elevational view of the fall tillage coulter shown in FIG. 6.

Turning now to fall tillage coulter $4_f$ itself, fall tillage coulter $4_f$ comprises a circular, flat disc made from a hard, durable material such as steel. In one embodiment, fall tillage coulter $4_f$ has a diameter of approximately 33" and a thickness or width of 0.375 inches. The circumference of fall tillage coulter $4_f$ is notched in the manner of a very large saw blade. The circumference of fall tillage coulter $4_f$ includes a plurality of equally spaced teeth 56 separated by notches 58. As shown in FIG. 6, there are twelve teeth 56 separated by twelve notches 58.

The diameter and width of fall tillage coulter $4_f$, whether fall tillage coulter $4_f$ is notched or not, the number and size of teeth 56 and notches 58 when fall tillage coulter $4_f$ is notched, etc., are all variable from that shown herein to accommodate different types of soil and crop residue. For example, fall tillage coulter $4_f$ could have a diameter as small as approximately 22" and a width as small as approximately ¼" depending upon the soil and crop residue. In general, it is desirable to minimize the diameter and width of fall tillage coulter $4_f$ to minimize the amount of downforce required to push fall tillage coulter $4_f$ into the ground. However, no more than about 30% of the diameter of fall tillage coulter $4_f$ should sink into the ground.

Preferably, the edges of teeth 56 and notches 58 are sharpened to form a knife edge 59 extending along a longitudinal centerline through fall tillage coulter $4_f$. See FIG. 10. However, knife edge 59 could be displaced from the centerline to lie along one or the other of the left and right faces of fall tillage coulter $4_f$. Moreover, some or all of the edges of teeth 56 and notches 58 could also be blunt, though some type of sharpened knife edge 59 is preferred to allow fall tillage coulter $4_f$ to more easily slice into the ground.

Fall tillage coulter $4_f$ preferably carries a plurality of shovel bits 60 spaced around the circumference. Bits 60 are replaceable in each tooth 56 of fall tillage coulter $4_f$. Since there are twelve teeth 56, there are twelve bits 60. However, if fall tillage coulter $4_f$ had no teeth 56 or notches 58, then bits 60 would simply be carried around the circumference of fall tillage coulter $4_f$. The number of bits 60 and the spacing between bits 60 can obviously vary from that shown herein. Bits 60 are also made of a hard, durable material, such as steel or the like.

Each tooth 56 of fall tillage coulter $4_f$ includes a bit receiving slot 62 in the outermost end of tooth 56 with slot 62 extending generally radially inwardly from the circumference of fall tillage coulter $4_f$ towards the center of fall tillage coulter $4_f$. A hole 64 extends through fall tillage coulter $4_f$ below and in line with each slot 62 in fall tillage coulter $4_f$. Bit 60 is designed to slide into slot 62 and to snap into place with bit 60 being retained in slot 62 by one of the holes 64 on fall tillage coulter $4_f$.

Figure 9:
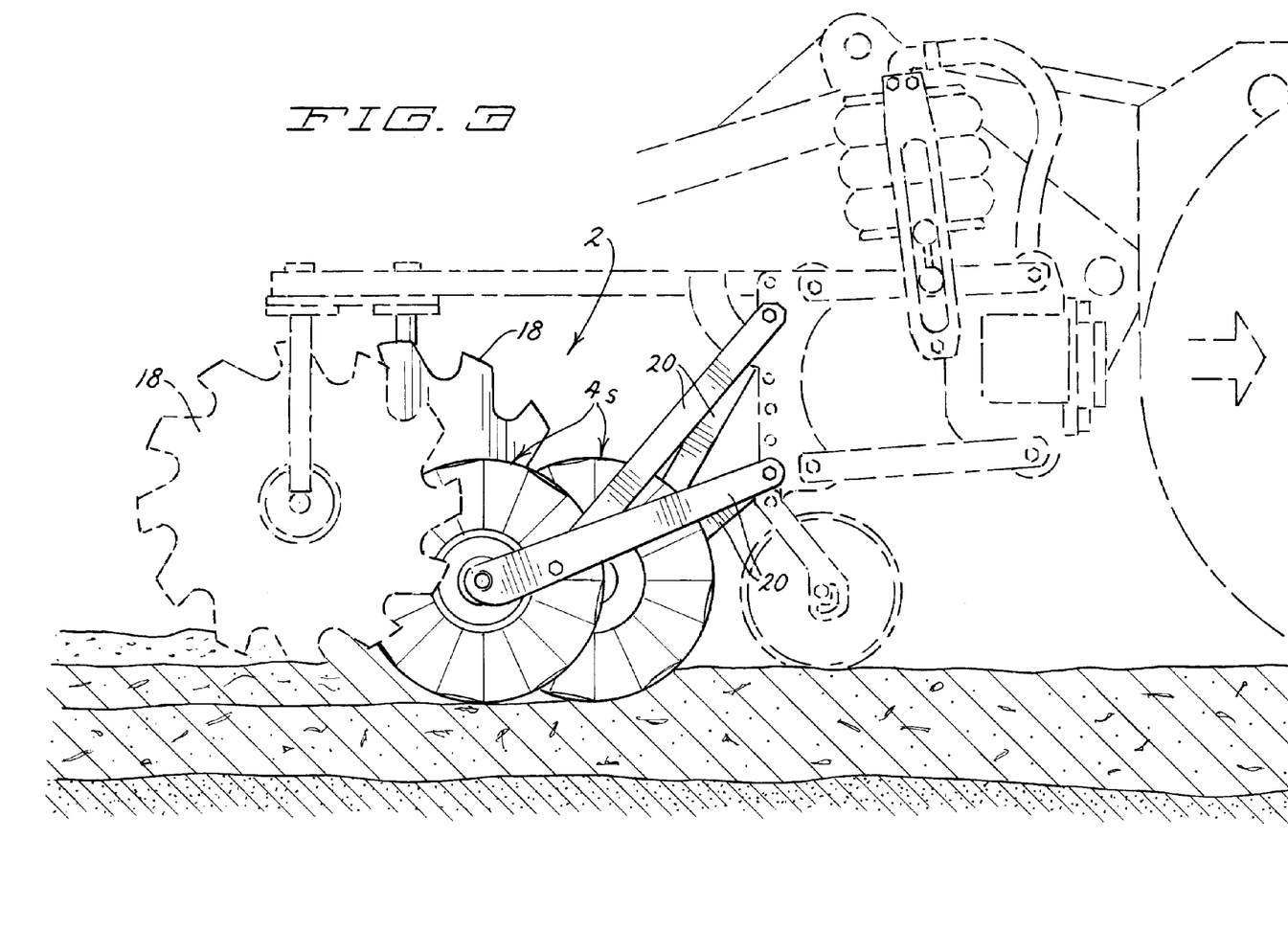
FIG. 9 is an enlarged front elevational view of the circled portion of the fall tillage coulter as shown in FIG. 7.
Figure 10:
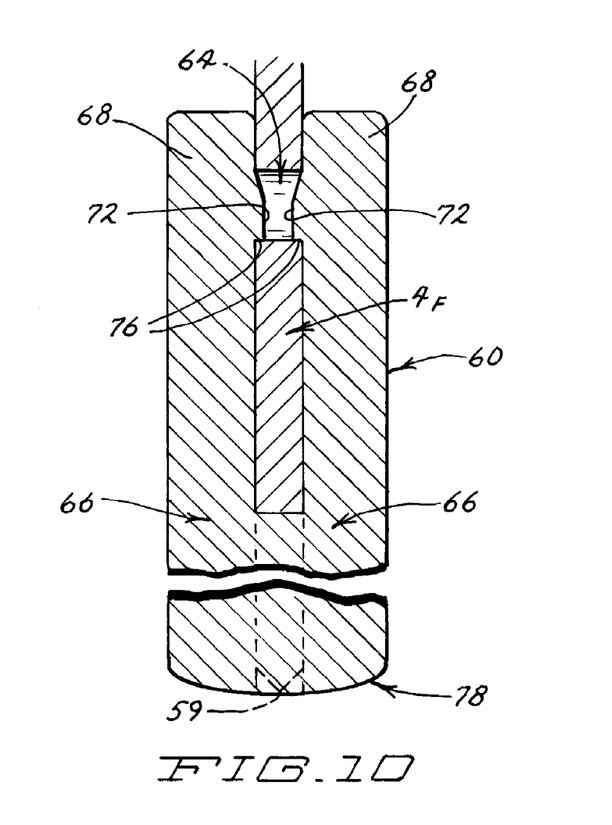
FIG. 10 is a cross-sectional view taken along lines 10-10 in FIG. 9, particularly illustrating one of the shovel bits in place in the slot therefor in the fall tillage coulter.

As is apparent from FIGS. 9 and 10, bit 60 is considerably wider than the width of fall tillage coulter 4$_f$. Thus, the sides of bit 60 form wings 66 that project laterally beyond either face of fall tillage coulter 4$_f$ when bit 60 is installed in slot 62. With a fall tillage coulter 4$_f$ having a width of 0.375 inches, a bit 60 having a width of 1.25 inches is one embodiment that has been found to provide good results. In this case, each wing 66 of bit 60 will have a width of 0.4375 inches, i.e. a width that is slightly wider than the width of fall tillage coulter 4$_f$ itself. Obviously, the width of bit 60 relative to fall tillage coulter 4$_f$ can also be varied.

Figure 8:
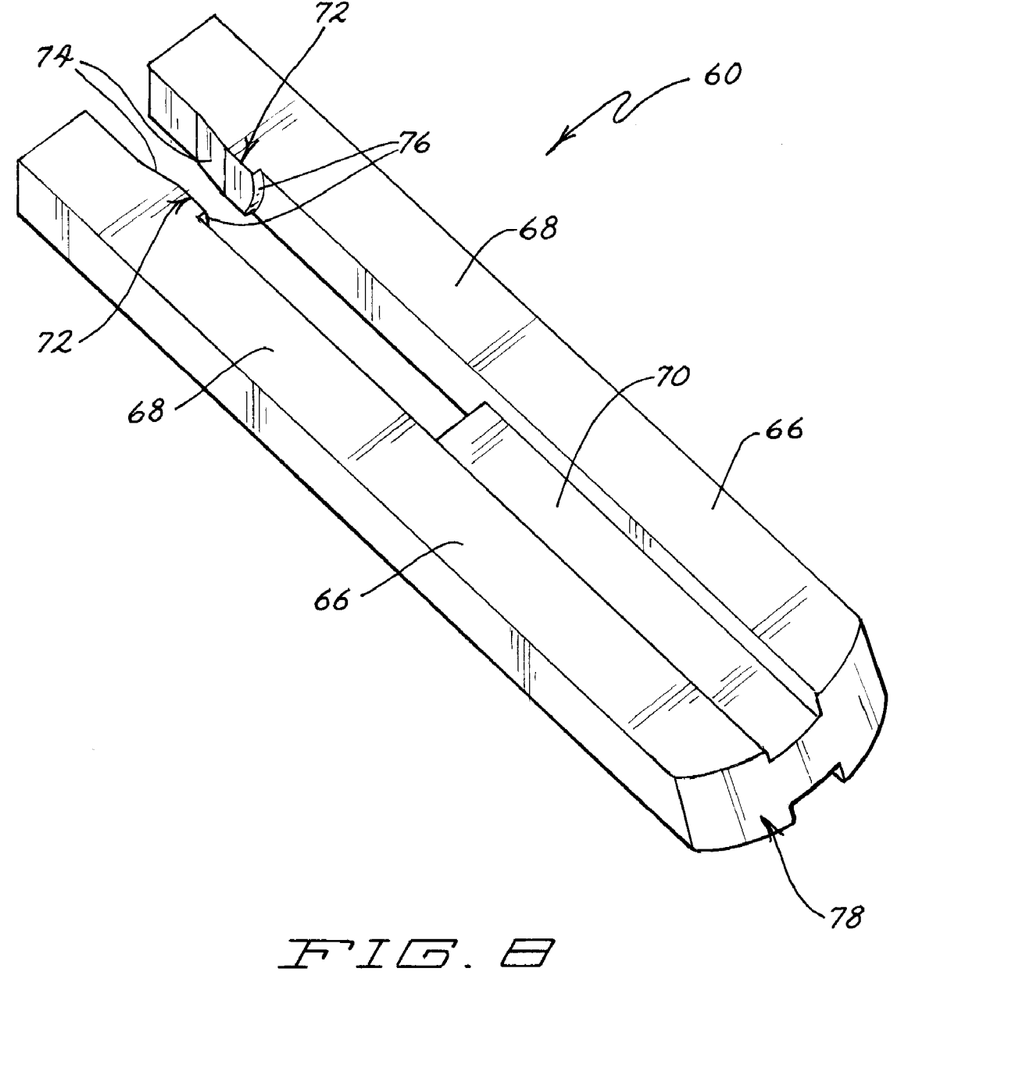
FIG. 8 is an enlarged perspective view of one of the shovel bits used on the fall tillage coulter of FIG. 6.

As shown in FIG. 8, bit 60 includes a pair of stiff but flexible lower legs 68. Legs 68 are biased inwardly so as to normally lie substantially parallel to one another as shown in FIG. 8. Bit 60 also has a notched central slide 70 thereon that is received in a slot 62. The inside surface of each leg 68 has an inwardly protruding shoulder 72 that cooperates with a hole 64. Shoulder 72 forms an inclined lower ramp 74 and a blunt upper stop 76.

To insert a bit 60 into fall tillage coulter 4$_f$, slide 70 on bit 60 is aligned with slot 62 in tooth 56 with each leg 68 of bit 60 lying alongside each face of fall tillage coulter 4$_f$. Slide 70 is then pushed or hammered into slot 62. As bit 60 moves inwardly relative to tooth 56, the inclined lower ramps 74 force or cam legs 68 of bit 60 apart to permit legs 68 to slide along each face of fall tillage coulter 4$_f$. When slide 70 on bit 60 is fully inserted into slot 62, the normal inward bias on legs 68 will cause legs 68 to snap back towards one another until shoulders 72 are received in one hole 64 with the upper stops 76 resting against and being retained by the radially outward edge of hole 64.

As shown most clearly in FIG. 10, the tip 78 of bit 60 is gently rounded across the width of bit 60. In addition, as shown in FIG. 6, tip 78 is beveled or sharpened between the leading and trailing edges thereof taken with respect to the usual direction of rotation of fall tillage coulter 4$_f$ when tool 2 is moving forwardly. The leading edge of tip 78 preferably extends slightly radially beyond the adjacent outer edge of tooth 56, e.g. by 0.5 inches or so. FIG. 6 shows one bit 60 in one slot 62 with the arrow C representing the usual direction of rotation of fall tillage coulter 4$_f$ when tool 2 is moving forwardly.

Bits 60 can be removed and replaced without using any fasteners. To install a bit 60, bit 60 is merely hammered into a slot 62 until legs 68 spread apart and eventually snap into holes 64. To remove a bit 60, the user can use some type of pry tool to spread legs 68 of bit 60 apart somewhat. The user can then hammer on the lower ends of legs 68 of bit 60 to force shoulders 72 on legs 68 upwardly out of and past holes 64.

However, other ways of affixing bit 60 in fall tillage coulter 4$_f$ could be used. For example, legs 68 of bit 60 could be affixed to each side of fall tillage coulter 4$_f$ using a simple pin that would pass through aligned holes in legs 68 and in fall tillage coulter 4$_f$. While not preferred, bits 60 could even be integrally formed on fall tillage coulter 4$_f$.

As is clear from FIG. 6, bit 60 does not lie along a purely radial line, but is forwardly raked relative to such a radial line as indicated by the forward rake angle α in FIG. 6. Rake angle α is in the range of from 15° to 30° and is preferably approximately 20°. In addition, each tooth 56 has a similar, though smaller 5° to 15°, forward rake angle β as measured by the inclined leading edge of tooth 56. See FIG. 6. This helps fall tillage coulter 4$_f$ slice into and cut crop residue lying on the ground as fall tillage coulter 4$_f$ slices down into the ground.

The Fall Tillage Operation

After a crop is harvested, tool 2 of this invention will be configured as shown in FIGS. 1 and 2. In other words, fall tillage coulter 4$_f$ carrying bits 60 will be installed on tool frame 6. A pair of trailing containment coulters 18 will follow fall tillage coulter 4$_f$ on tool frame 6. Containment coulters 18 will have a slightly smaller diameter than the diameter of fall tillage coulter 4$_f$, e.g. 26" instead of 33". Containment coulters 18 are preferably saw toothed around their circumference in a manner similar to fall tillage coulter 4$_f$.

If the soil is relatively dry, containment coulters 18 will be placed in a toed in condition to help confine the lateral spread of the soil and to cause the soil to mound up along the zone. If the soil is relatively damp, the amount of the toe in on containment coulters 18 will be reduced or possibly even eliminated with containment coulters 18 simply being parallel to one another. Again, there is not just one tool 2 mounted to tool bar 26. Instead, an array of side-by-side tools 2 will be spaced across the width of tool bar 26 in a spacing corresponding to the spacing of the next row crop that is to be planted in the field.

Tool bar 26 is itself carried on the three point hitch of the tractor. This allows tool 2 to be carried in an upper transport position or to be lowered into a lower working position. When the farmer reaches the field that is to be tilled, the three point hitch can be lowered to engage tool 2 with the ground. The farmer can then drive the tractor in a forward direction indicated by the arrow B in FIG. 2.

As tool 2 moves forwardly, the farmer can also activate the compressed air supply on the tractor and adjust the pressure thereof to put a desired downforce on tool frame 6 using downforce system 34. As the tractor moves forwardly and as air bag 36 is pressurized, fall tillage coulter 4$_f$ will roll forwardly along the ground and will sink into the ground to a depth suitable for fall tillage. This depth will be somewhere in excess of 6 inches, within the range of about 6 to 10 inches, and preferably about 7 to 9 inches.

As fall tillage coulter 4$_f$ rotates about axle 22 in the direction of arrow C as shown in FIG. 2, each bit 60 rotates around with fall tillage coulter 4$_f$. The leading edge of tooth 56 will begin to cut a slit in the ground as is typical of a coulter. Almost immediately thereafter, tip 78 of bit 60 carried on that tooth 56 bites into the ground. Because of the forward rake angle α of bit 60, bit 60 is approximately vertical to the ground at this time. Thus, the entry of bit 60 into the ground is smoother and easier and takes less force, particularly since tip 78 of bit 60 is beveled between the leading and trailing edges thereof. Obviously, wings 66 of bit 60 will enter portions of the ground immediately to either side of the slit being cut by fall tillage coulter 4$_f$.

As tooth 56 rotates around beneath ground level as shown in FIG. 2, bit 60 will also rotate from its generally vertical entry position to a generally horizontal exit position. In FIG. 2, see the generally vertical entry position of bit 60$a$ and the generally horizontal exit position of bit 60$b$. In effect, each bit 60 lifts and loosens the soil with a rearwardly and upwardly directed soil scooping action. Such an action is opposite to the forward direction of movement of tool 2. Thus, there is almost no likelihood that fall tillage coulter 4$_f$ or containment coulters 18 will become plugged with soil or debris.

In addition, the manner in which bits 60 lift and loosen the soil provides a major advance in zone tillage. In conventional zone tillage tools using a fixed knife that is forced forwardly through the soil, the Applicant has discovered that such a knife compacts the soil in various ways even as it tills the soil. For example, as the knife point wears and becomes dull, the Applicant has observed that the knife will smear and compact the soil along the bottom and sides of the tilled zone similarly to what happens when one drags one's heel through dirt. The Applicant has further discovered that this compacted soil at the bottom of the tilled zone does two undesirable things: it serves as a barrier to root growth and it also forms a channel or raceway for water which facilitates the tendency for rainwater to washout the tilled zone when the tilled zone traverses up a hill or rise.

By contrast, the operation of fall tillage coulter $4_f$ lifts and loosens the soil without substantially compacting the soil. To the extent there is any compaction from the entry of a tooth 56 into the ground, bit 60 carried by tooth 56 will immediately lift, loosen and break up such soil as it follows immediately behind the leading edge of this tooth 56. Moreover, the entry of bit 60 in a generally vertical entry position into the ground minimizes any soil compaction from bit 60 itself. Again, if there is any such soil compaction from bit 60, the next succeeding bit 60 will break up this compacted soil as it rotates up and out of the soil due to the relatively close circumferential spacing of bits 60. In addition, the transition of each bit from its vertical entry position to its horizontal exit position produces a natural lifting from below action that lifts and loosens the soil without compacting it. Each bit 60 is responsible for lifting and loosening only a small, manageable amount of soil.

The trailing containment coulters 18 help confine the soil that has been lifted and loosened and help mound such soil on top of the tilled zone. In addition to possibly being toed in as shown in FIG. 4, containment coulters 18 are also canted outwardly between the top and bottom thereof as described earlier. This outward cant as well as the front to back toe in helps containment coulters 18 form the soil that has been lifted and loosened by fall tillage coulter $4_f$ into a mound lying directly atop the zone. In addition, notches (not shown) are formed along each side of the mound by the toothed nature of containment coulters 18. These notches help prevent erosion of the mound and this effect can be enhanced by having the teeth and notches on containment coulters 18 be relatively blunt and not sharp.

FIG. 2 shows the fall tillage operation taking place. The soil lifting and loosening operations of each bit 60 leave the tilled zone with a bottom having shallow scallops 80 as shown in FIG. 2. This is in contrast to the compacted straight bottom left by the knife of prior art zone tillage tools. Thus, the tilled zone is much less likely to wash out even when it goes up a hill or rise since there is no hard compacted straight bottom in the zone. The scallops 80 in the bottom, and the fact that the bottom is not compacted, inhibit the flow of water down along the zone and facilitates drainage of water through the bottom of the zone to greatly decrease washouts. This will facilitate the use of zone tillage in rolling or on hilly land.

Figure 11:
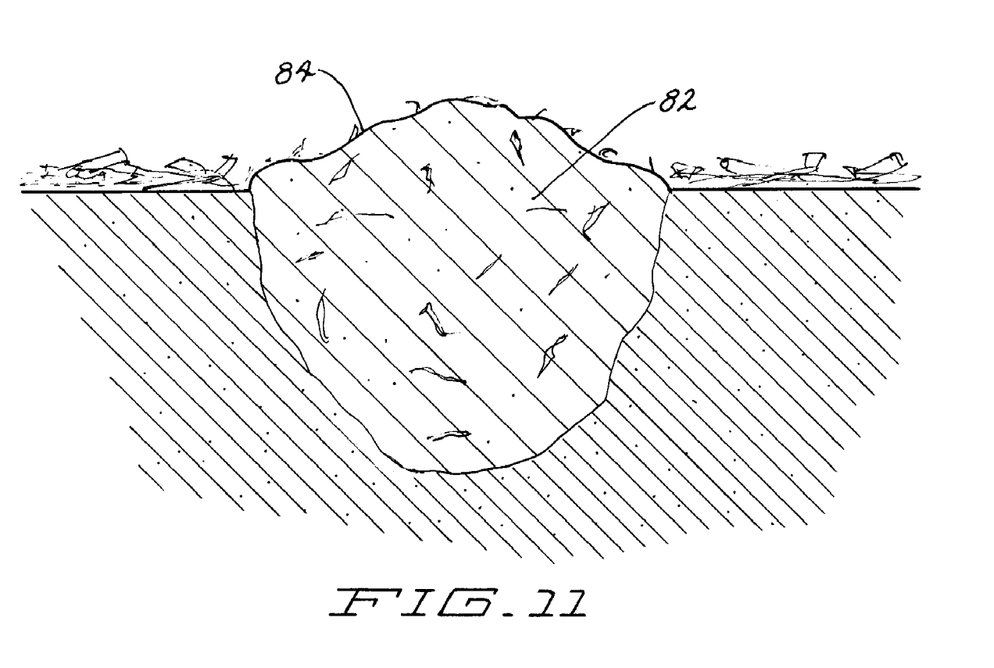
FIG. 11 is a cross-sectional view taken laterally through one of the zones tilled by the zone tillage tool of FIG. 1, particularly illustrating the soil that has been lifted, loosened and mounded in the zone by the operation of the fall tillage coulter shown in FIG. 1.

FIG. 11 is a cross-sectional view of a tilled zone 82 following operation of fall tillage coulter $4_f$ and its containment coulters 18. The soil has been rather uniformly lifted and loosened from top to bottom and from side to side and forms a neat mound 84 on top. Little or no soil compaction is found in the zone 82 or along the sides and bottom of the tilled zone 82. Thus, beneficial microbial action is facilitated within the tilled zone 82. In addition, root growth has often been found extending well below the tilled zone.

As is conventional in zone tillage, fertilizer will also typically be applied to the tilled zone by an additional fertilizer tool of known design (not shown). This fertilization step can take place substantially simultaneously with the tillage step or immediately thereafter.

The Spring Tillage Configuration

The Spring Coulters

After the zone has been tilled and fertilized in the fall using fall tillage coulter $4_f$, it is usual to retill and refertilize the zone again in the spring before planting. Tool 2 of this invention can be easily switched between fall and spring configurations with the removal and reinstallation of four bolts, namely the bolts holding the two pairs of support arms 20 for fall tillage coulter $4_f$ to tool frame 6. When these bolts are removed, fall tillage coulter $4_f$ will be detached from tool frame 6 and can simply be rolled away to be stored for reuse after the next harvest.

With fall tillage coulter $4_f$ removed, it is easy to install a pair of conventional spring bubble coulters $4_s$ having a sharpened wavy or fluted circumference, rather than a toothed circumference. Each spring coulter $4_s$ is supported on a stub axle 22 carried by a single pair of support arms 20. The support arms 20 of each spring coulter $4_s$ bolt to one side plate 8 of tool frame 6. The support arms 20 of one spring coulter $4_s$ are shorter than the support arms 20 of the other spring coulter $4_s$ so that the two coulters $4_s$ are longitudinally staggered relative to one another, i.e. one coulter $4_s$ is somewhat in advance of the other coulter $4_s$.

While spring coulters $4_s$ of this type are known for use in zone tillage, tool 2 of this invention provides for the continued use of a pair of notched containment coulters 18 trailing spring coulters $4_s$. Preferably, the two containment coulters 18 are also longitudinally staggered relative to each other in the same manner as spring coulters $4_s$. Thus, referring to FIG. 5, one spring coulter $4_s$ along with one containment coulter 18 on the same side of tool frame 6 will be ahead of the corresponding spring coulter $4_s$ and containment coulter 18 on the other side of tool frame 6.

When using spring coulters $4_s$ in place of fall tillage coulter $4_f$, downforce system 34 is adjusted to provide some downforce but less downforce than in the fall. Spring coulters $4_s$ will be run much shallower than fall tillage coulter $4_f$, e.g. at approximately 4 inches or less. Typically, spring coulters $4_s$ will operate at 2 to 3 inches of depth. It is only necessary that spring coulters $4_s$ fluff and dry the soil in advance of planting. Again, containment coulters 18 are useful in confining and mounding the fluffed soil in the tilled zone.

Modifications

Various modifications of this invention will be apparent to those skilled in the art. For example, spring coulters $4_s$ could be flat rather than having a wavy circumference. The relative sizes of the coulters $4_f$, $4_s$ and 18 can vary to be larger or smaller. Other ways of achieving downforce on the coulters could be used instead of the pneumatic air bags 36. Accordingly, this invention is to be limited only by the appended claims.

I claim:

1. A zone tillage tool for tilling soil in a plurality of parallel elongated zones in a farm field with the zones being laterally spaced apart or separated from one another by untilled portions of the farm field, which comprises:

(a) a laterally extending tool bar overlying the farm field and movable across the farm field in a forward direction of motion;

(b) a plurality of rotary tillage coulters operatively carried on the tool bar with each tillage coulter rotating about a substantially horizontal axis for rolling over the farm field in engagement with the soil, wherein the tillage coulters are parallel to one another, rotate in planes that are parallel to the forward direction of motion of the tool bar, and are laterally spaced apart from one another along the tool bar by a lateral spacing equal to the lateral spacing of the zones such that a single rotary tillage coulter tills the soil to form a single zone, each tillage coulter having a circumference that is notched to provide a plurality of teeth having leading edges taken with reference to a direction of rotation of the coulter as the tool frame is moved forwardly over the zone; and (c) a plurality of substantially radially extending shovel bits carried around the circumference of each tillage coulter, wherein each shovel bit has at least a portion which forms a substantially radially extending and laterally projecting wing on at least one face of the tillage coulter which wing lifts and loosens the soil in the zone as the tillage coulter rolls along the zone and the shovel bit is inserted into and rotated through the soil in the zone by rotation of the tillage coulter, wherein the laterally projecting wings of the shovel bits are the only laterally projecting members carried on the tillage coulter that act on or till the soil in the zone along which the tillage coulter rolls, and wherein the shovel bits are carried by the teeth of the tillage coulters with the shovel bits being located in a trailing position behind the leading edges of the teeth that carry the shovel bits to expose the leading edge of each tooth to the soil to permit the leading edge of each tooth to enter the soil before the shovel bit carried by said tooth enters the soil.

2. The zone tillage tool of claim 1, wherein each shovel bit forms a laterally projecting wing on each of a pair of opposed faces of the tillage coulter.

3. The zone tillage tool of claim 2, wherein each shovel bit is received in a slot in the circumference of the tillage coulter, and wherein each shovel bit is wider than a width of the tillage coulter so that the wings on each face of the tillage coulter are formed by those portions of the shovel bit that project laterally beyond each face of the tillage coulter.

4. The zone tillage tool of claim 3, wherein the wings are at least about as wide as the width of the tillage coulter.

5. The zone tillage tool of claim 1, wherein the shovel bits are removable and replaceable on the tillage coulter.

6. The zone tillage tool of claim 5, wherein the shovel bits have a snap fit on the tillage coulter.

7. The zone tillage tool of claim 1, wherein the shovel bits have a forward rake angle with respect to a radial line from the axis of rotation of the tillage coulter.

8. The zone tillage tool of claim 7, wherein the forward rake angle is selected to allow a tip of the shovel bit to be approximately vertical when the shovel bit first enters the ground.

9. The zone tillage tool of claim 1, wherein each shovel bit has a tip that is beveled between the leading and trailing edges thereof when taken with respect to a direction of rotation of the tillage coulter.

10. The zone tillage tool of claim 1, further including a plurality of parallel lift linkages for connecting tillage coulters to the tool bar, each tillage coulter being provided with its own separate parallel lift linkage.

11. The zone tillage tool of claim 1, further including a pair of separate containment coulters that are provided for each tillage coulter with the containment coulters in each pair thereof being arranged in a partially trailing position to the tillage coulter with the tillage coulter located between the containment coulters.

12. A zone tillage tool for tilling soil in an elongated zone in a farm field, which comprises:
(a) a tool frame;
(b) a tillage coulter carried on the tool frame for rotation about an axis, the tillage coulter having a circumference;
(c) a plurality of shovel bits carried around the circumference of the tillage coulter, and wherein each shovel bit has at least a portion which forms a laterally projecting wing on at least one face of the tillage coulter which wing lifts and loosens the soil in the zone as the tillage coulter rolls along the zone and the shovel bit is inserted into and rotated through the soil in the zone by rotation of the tillage coulter;
(d) a parallel lift linkage for connecting the tool frame to a tool bar; and
(e) an air bag on top of the parallel lift linkage overlying a pair of upper parallel links of the parallel lift linkage with the air bag being attached to the pair of upper parallel links for applying downforce on the parallel lift linkage to rotate the parallel lift linkage towards the ground to force the tillage coulter into the ground.

13. The zone tillage tool of claim 12, wherein the air bag has a diameter that is larger than a lateral spacing between the upper parallel links of the parallel lift linkage to increase the air bag's capacity relative thereto.

14. A zone tillage tool for tilling soil in an elongated zone in a farm field, which comprises:
(a) a tool frame;
(b) at least one tillage coulter rotatably carried on the tool frame;
(c) wherein the tillage coulter is notched around a circumference thereof to define a plurality of teeth having leading and trailing edges taken with reference to a direction of rotation of the coulter as the tool frame is moved forwardly over the zone, and wherein the leading edge of each tooth on the tillage coulter is forwardly raked relative to a radial line from an axis of rotation of the tillage coulter; and
(d) further including a plurality of generally radially extending shovel bits carried on the teeth of the tillage coulter, wherein each shovel bit has at least a portion which forms a substantially radially extending and laterally projecting wing on at least one face of the tillage coulter which wing lifts and loosens the soil in the zone as the tillage coulter rolls along the zone and the shovel bit is inserted into and rotated through the soil in the zone by rotation of the tillage coulter, wherein the laterally extending wings of the shovel bits are also forwardly raked with respect to a radial line from the axis of rotation of the tillage coulter, and wherein the laterally extending wings of the shovel bits have a forward rake angle that is larger than a forward rake angle of the leading edges of the teeth.

15. A zone tillage tool for tilling soil in a plurality of parallel elongated zones in a farm field with the zones being laterally spaced apart or separated from one another by untilled portions of the farm field, which comprises:
(a) a laterally extending tool bar overlying the farm field and movable across the farm field in a forward direction of motion;
(b) a plurality of rotary tillage coulters operatively carried on the tool bar with each tillage coulter rotating about a substantially horizontal axis for rolling over the farm field in engagement with the soil, wherein the tillage coulters are parallel to one another, rotate in planes that are parallel to the forward direction of motion of the tool bar, and are laterally spaced apart from one another along the tool bar by a lateral spacing equal to the lateral spacing of the zones such that a single rotary tillage coulter tills the soil to form a single zone, each tillage coulter having a circumference that is notched to provide a plurality of teeth; and (c) a plurality of substantially radially extending shovel bits carried around the circumference of each tillage coulter, wherein each shovel bit has at least a portion which forms a substantially radially extending and laterally projecting wing on at least one face of the tillage coulter which wing lifts and loosens the soil in the zone as the tillage coulter rolls along the zone and the shovel bit is inserted into and rotated through the soil in the zone by rotation of the tillage coulter, and wherein the laterally projecting wings of the shovel bits are the only laterally projecting members carried on the tillage coulter that act on or till the soil in the zone along which the tillage coulter rolls, wherein the shovel bits are carried by the teeth of the tillage coulter substantially midway between leading and trailing edges of the teeth.

16. A zone tillage apparatus for tilling soil in a plurality of parallel elongated zones in a farm field with the zones being laterally separated from one another by untilled portions of the farm, which comprises:

(a) a tool bar having a length that extends laterally relative to a forward direction of motion of the tool bar; and (b) a plurality of zone tillage tools mounted on the tool bar with the zone tillage tools being laterally spaced apart from one another along the length of the tool bar, wherein each zone tillage tool comprises;

(i) a tool frame;

(ii) only a single tillage coulter carried on the tool frame for rotation about a substantially horizontal axis, the tillage coulter having a circumference;

(iii) a plurality of substantially radially extending shovel bits carried around the circumference of the tillage coulter, wherein each shovel bit has at least a portion which forms a substantially radially extending and laterally projecting wing on at least one face of the tillage coulter which wing lifts and loosens the soil in one zone as the tillage coulter rolls along the one zone and the shovel bit is inserted into and rotated through the soil in the one zone by rotation of the tillage coulter;

(iv) a pivotal linkage connecting the tool frame to the tool bar to allow the tool frame to move vertically up and down relative to the tool bar;

(v) a downforce applying device acting between the tool frame and the tool bar for forcing each tool frame and the tillage coulter carried thereon downwardly relative to the tool bar to cause the tillage coulter to penetrate into the soil in the one zone to a desired depth; and (vi) a pair of containment coulters carried by the tool frame in a partially trailing position to the tillage coulter with the tillage coulter located between the containment coulters; and (c) wherein each zone tillage tool has its own tool frame, its own tillage coulter, its own pivotal linkage, its own downforce applying device, and its own pair of containment coulters such that each zone tillage tool is able to act independently of the other zone tillage tools.

17. The zone tillage apparatus of claim 16, wherein the pivotal linkage is a parallel lift linkage.

18. The zone tillage apparatus of claim 16, wherein the downforce applying device is an air bag.

19. The zone tillage apparatus of claim 16, wherein the circumference of the tillage coulter of each zone tillage tool is notched to provide a plurality of teeth with the shovel bits being carried on the teeth of the tillage coulter, and wherein each containment coulter of each zone tillage tool is also notched around a circumference thereof to provide a plurality of teeth.

20. The zone tillage apparatus of claim 19, wherein a leading edge of each tooth on the tillage coulter is forwardly raked relative to a radial line extending from an axis of rotation of the tillage coulter, and wherein a leading edge of each tooth on each containment coulter is rearwardly raked relative to a radial line extending from an axis of rotation of the containment coulter.

* * * * *